United States Patent
Heald et al.

(10) Patent No.: US 6,672,331 B2
(45) Date of Patent: Jan. 6, 2004

(54) BONNET SECUREMENT FOR GAS PRESSURE REGULATORS

(75) Inventors: Paul W. Heald, San Marcos, TX (US); Christopher G. Turney, The Woodlands, TX (US)

(73) Assignee: S. H. Leggitt Company, San Marcos, TX (US)

( * ) Notice: Subject to any disclaimer, the term of this patent is extended or adjusted under 35 U.S.C. 154(b) by 20 days.

(21) Appl. No.: 09/919,135

(22) Filed: Jul. 31, 2001

(65) Prior Publication Data

US 2002/0014267 A1 Feb. 7, 2002

Related U.S. Application Data

(60) Provisional application No. 60/221,782, filed on Jul. 31, 2000.

(51) Int. Cl.[7] .................................................. F16K 31/12
(52) U.S. Cl. ................ 137/505; 220/309.2; 137/315.05
(58) Field of Search ........................... 220/309.1, 309.2, 220/310.1, 796, 800; 137/505, 315.05

(56) References Cited

U.S. PATENT DOCUMENTS

| 876,563 A | * | 1/1908 | La Fave .................... 220/309.2 |
| 1,710,999 A | | 4/1929 | Schmid |
| 2,737,201 A | | 3/1956 | St. Clair et al. |
| 2,737,202 A | | 3/1956 | Baldwin, Jr. et al. |
| 3,139,898 A | | 7/1964 | Wiltgen et al. |
| 3,302,534 A | * | 2/1967 | Bauer et al. .................... 251/61 |
| 3,374,014 A | | 3/1968 | Kull et al. |
| 3,664,369 A | | 5/1972 | Johnson |
| 3,792,717 A | | 2/1974 | Tibbals, Jr. |
| 4,204,561 A | * | 5/1980 | Ludwig ...................... 137/510 |
| 4,635,537 A | | 1/1987 | Field |
| 4,653,528 A | | 3/1987 | Field et al. |
| 4,741,360 A | | 5/1988 | Affeldt et al. |
| 5,076,320 A | | 12/1991 | Robinson |
| 5,131,425 A | | 7/1992 | Sturgis |
| 5,143,077 A | | 9/1992 | Kobayashi |
| 5,680,703 A | | 10/1997 | Ono et al. |
| 5,881,765 A | | 3/1999 | Turney et al. |
| 5,996,617 A | | 12/1999 | Olds et al. |

* cited by examiner

Primary Examiner—Stephen M. Hepperle
(74) Attorney, Agent, or Firm—Price, Heneveld, Cooper, DeWitt & Litton

(57) ABSTRACT

A pressure regulator having a base and a bonnet. The base includes a plurality of upstanding ridges, with an opening being defined between each of the ridges. The bonnet includes a peripheral rim having a plurality of engagement tabs located within each of the openings defined by the ridges of the base. The base is connected to the bonnet by folding the ridges over the peripheral rim of the bonnet. The ridges include side surfaces that mate with side edges of the engagement tabs to maintain the peripheral rim of the bonnet against the ridges as tension is applied to the peripheral rim that forces the peripheral rim away from the ridges. The bonnet also includes a plurality of interference tabs that engage an interior surface of the ridges before the ridges are folded over the peripheral rim of the bonnet to maintain the bonnet in proper position.

28 Claims, 3 Drawing Sheets

BONNET SECUREMENT FOR GAS PRESSURE REGULATORS

CROSS-REFERENCE TO RELATED APPLICATION

This application claims priority to Provisional Application No. 60/221,782 filed on Jul. 31, 2000, entitled BONNET SECUREMENT FOR GAS PRESSURE REGULATORS.

BACKGROUND OF INVENTION

This invention relates generally to the construction and assembly of two-piece pressure vessels or bodies for containing pressurized fluid, and more particularly to methods and apparatus for the improved retention of the top part of such bodies (e.g., "bonnets") upon the bottom (e.g., base) thereof. In a more particular sense, the invention relates to methods and apparatus for the securement of pressure regulator bonnets upon their underlying regulator body, and to improvements therein which enable the use of thinner, stamped sheet metal bonnets under pressure conditions which would have previously threatened failure due to bonnet distortion and resultant loosening.

In the past, pressure regulators and other such devices having an interconnected top and bottom defining hollow interior utilized cast metal parts for the top and bottom parts, and the top was secured to the bottom by a circumferential series of screws or the like which extended through holes in one such part (e.g., the top) and engaged corresponding threaded apertures in the other such part (e.g., the bottom). This produced sturdy and reliable pressure containers, but the fabrication and assembly was labor-intensive, time-consuming, and expensive. Due to the ever-present need for decreased manufacturing expense and lower product cost, various alternative methods of securement have been proposed and to some extent utilized over time. One such alternative which proved to be very effective was a process by which an upraised annular ridge or the like was integrally cast onto the bottom part and this was then forcibly deformed radially inwardly during assembly so as to overlie the perimetral edge of the upper body part, i.e., the bonnet. The approach could be automated, and proved quite effective when properly executed, but since the metal to be deformed extended all of the way around the lower body, the process was not necessarily simple to implement and required various special measures to carry it out properly. One such approach involved the use of an undulating deformation of this retaining ridge, to accommodate the excess material which occurred as the top of the annular ridge was forced radially inward and thus acquired a smaller circumference. This process produced a crimped "bottle cap" appearance, and it was quite effective and advantageous but did have certain minor disadvantages as well.

With increasing price competition and the ever-present need for less expensive manufacturing techniques, the concept of using a less expensive bonnet made of stamped metal rather than cast metal has emerged, but the secure and reliable retention of such a bonnet on the regulator body or other such element raises new difficulties, largely due to the fact that the thinner, stamped bonnet is more subject to being deformed by excess pressures which can occur inside the assembled pressure body. Bonnet distortion due to overpressure may result in various irregular shape changes, but most or all of these include some bulging or ballooning of the bonnet outwardly over its central portions, with resultant radially inward movement of the perimeter, and this often or even usually will destroy the integrity of the bonnet edge retention and perhaps even release the bonnet so that it is blown off the top of the regulator.

BRIEF SUMMARY OF THE INVENTION

The present invention is based on an apprehension of the problems noted above that apply with respect to use of thin, lightweight, stamped, or other such bonnets for pressure regulators and other such pressurized devices, and provides a unique and effective solution for the same that yields significant manufacturing economies.

Generally stated, the invention provides a novel cooperative and interacting bonnet and base component structure, by which the bonnet is made to be initially self-retaining against regulator diaphragm spring pressure or the like acting to displace the bonnet from the body prior to final assembly, and which is also easily and readily subjected to final assembly by cold-flow metal-forming techniques analogous to riveting or swedging, pursuant to which portions of the base component are deformed radially inwardly over edge portions of the bonnet and in addition certain interlocking structural pairs of the bonnet and base become engaged with one another. This engagement acts to lock the periphery of the bonnet in place upon the base and prevent disengagement thereof due to radially inward stresses applied to the bonnet edges as a result of deforming overpressure conditions.

Accordingly, the invention provides both a novel structure and a novel method of assembly, for achieving the foregoing purposes.

BRIEF DESCRIPTIONS OF THE DRAWINGS

DESCRIPTION OF PREFERRED EMBODIMENTS

Figure 1:
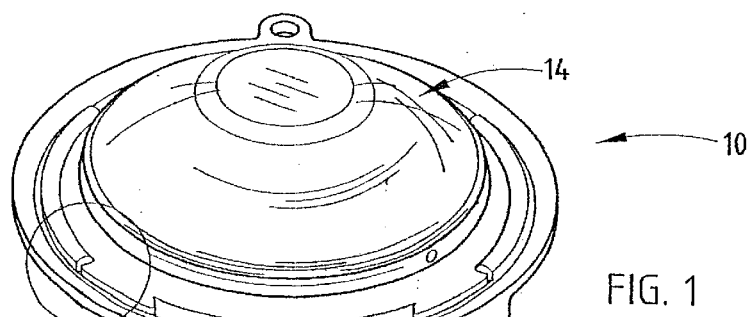
FIG. 1 is a perspective view showing the front, top, and side portions of an exemplary gas regulator embodying the invention.
Figure 2:
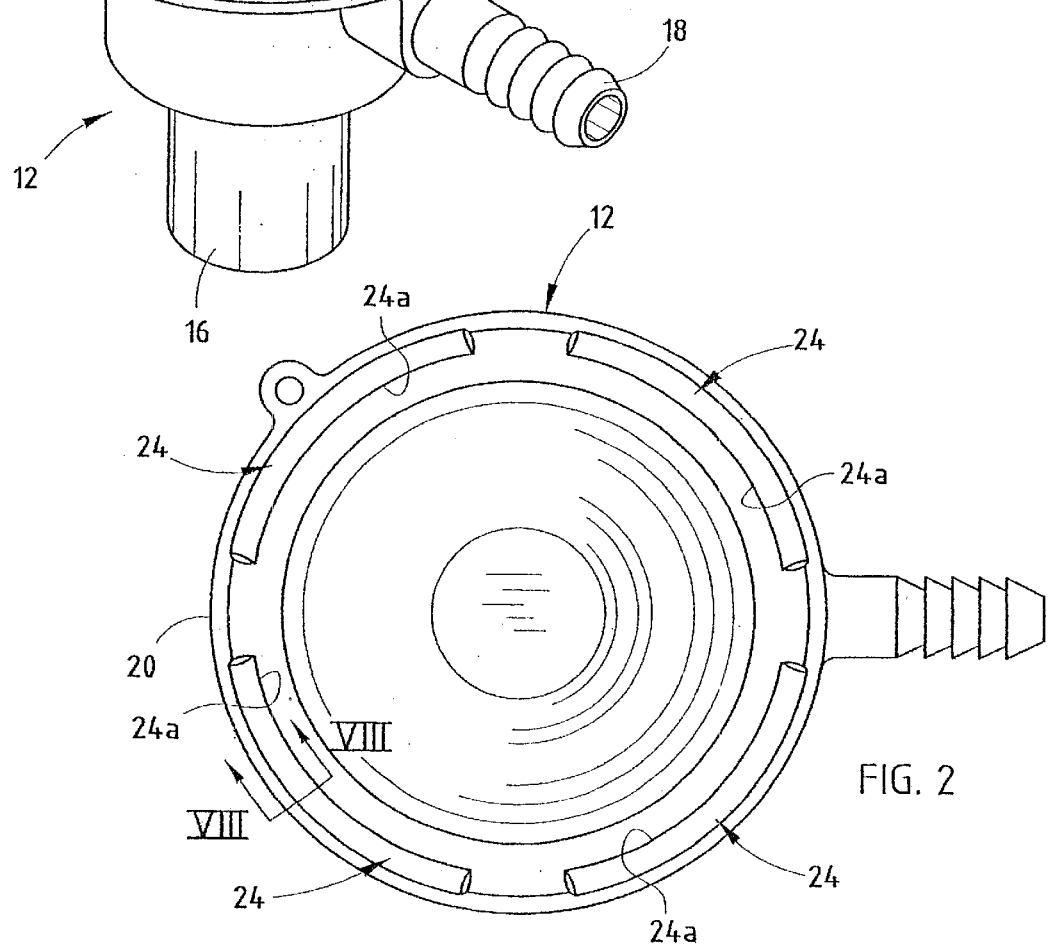
FIG. 2 is a top plan view of the structure shown in FIG. 1.

The novel apparatus envisioned by the invention is exemplified in FIG. 1 as a pressure regulator 10, having a base or body 12 atop which a bonnet 14 is mounted, secured in place in accordance with the invention. In the illustrated example, body/base 12 has a gas pressure inlet 16 and outlet 18, but these are incidental to the novel bonnet retention apparatus and method, and as indicated above the latter may be employed on fluid pressure vessels or bodies other than pressure regulators.

Figure 5:
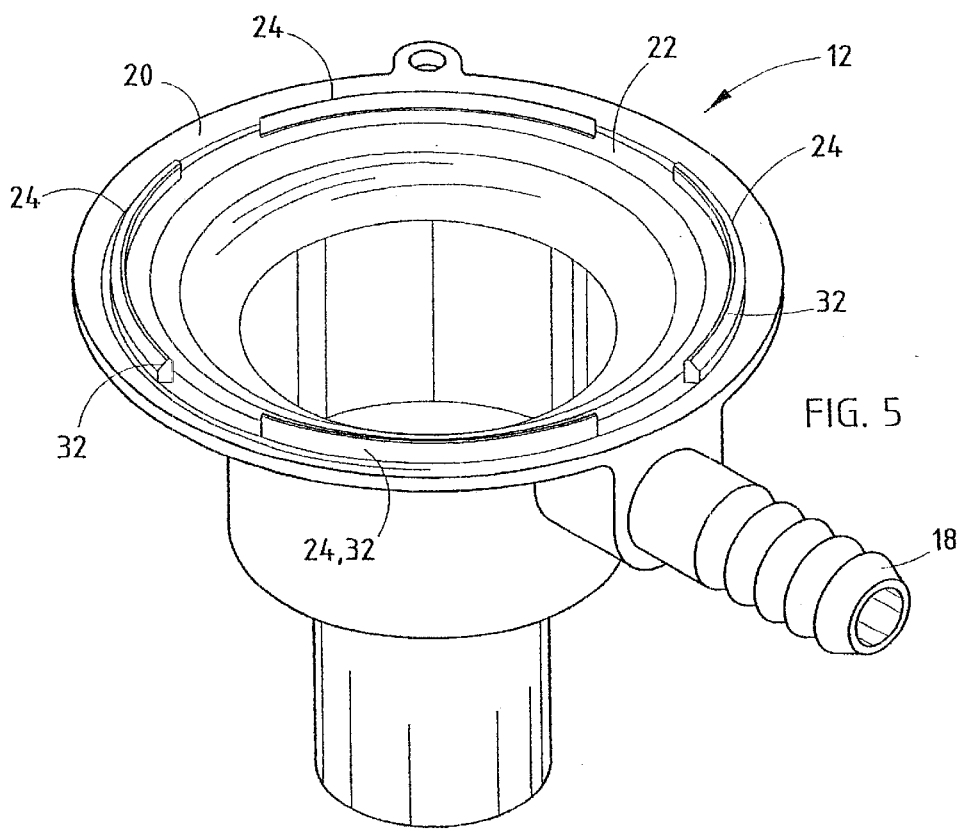
FIG. 5 is a perspective view similar to FIG. 4 but showing only the base, without the bonnet.

As shown in FIG. 5, body/base 12 has a generally hollow interior and comprises a bowl-like device, having an annular upper edge extremity 20 which encircles an adjacent flat, annular shoulder 22 extending completely around the top of body/base 12. Also, the uppermost part of body/base 12 includes a plurality (in the example, four) of arcuately extending, longitudinally aligned, endwise-spaced, upraised ridge formations 24, which protrude upwardly from edge 20 and shoulder 22 and whose mutual spacing defines an open area whose shape, location, and function are described in more detail below.

Figure 3:
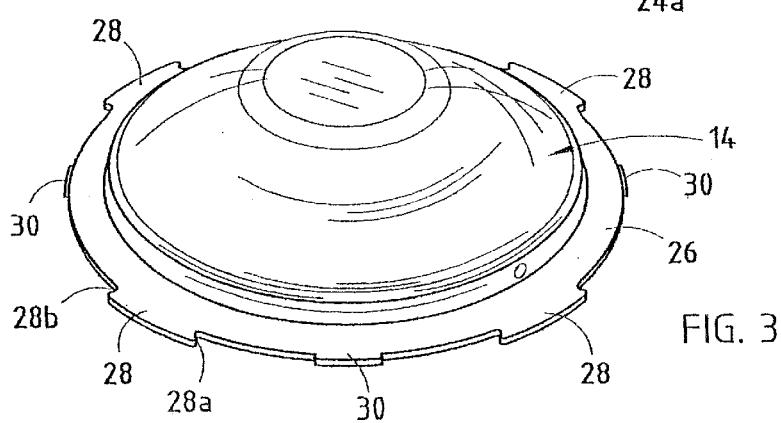
FIG. 3 is a perspective view similar to FIG. 1 but showing the bonnet only, apart from the base.

The bonnet 14, shown alone in FIG. 3, comprises an upwardly convex inverted bowl-like member having a flat and generally planar rim 26 around its outermost perimeter. Rim 26 is generally circular as shown in the illustrated embodiment, except for a series (in this embodiment, four) of outwardly extending retention tabs 28, which are equally spaced around its perimeter in this embodiment, and a somewhat similar sequence of outwardly projecting interference tabs 30, which are also equally spaced about its perimeter in this embodiment but which do not project outwardly as far as the retention tabs 28.

Figure 4:
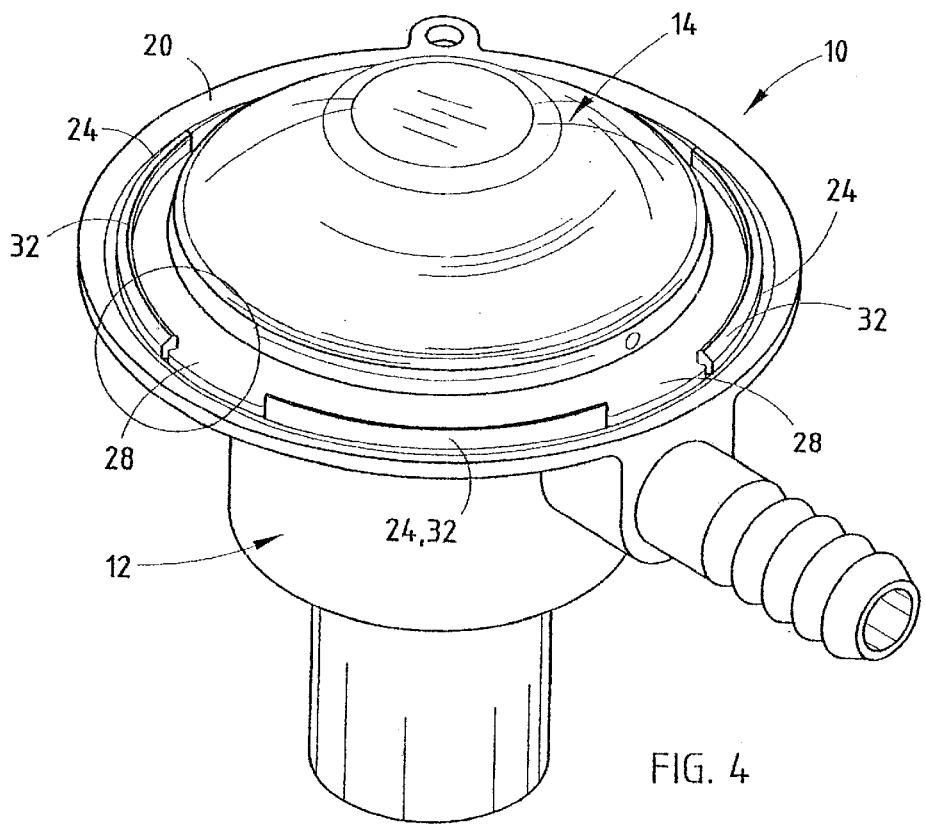
FIG. 4 is an enlarged perspective view similar to FIG. 1 but showing the components prior to final securement of the bonnet upon the base.
Figure 6:
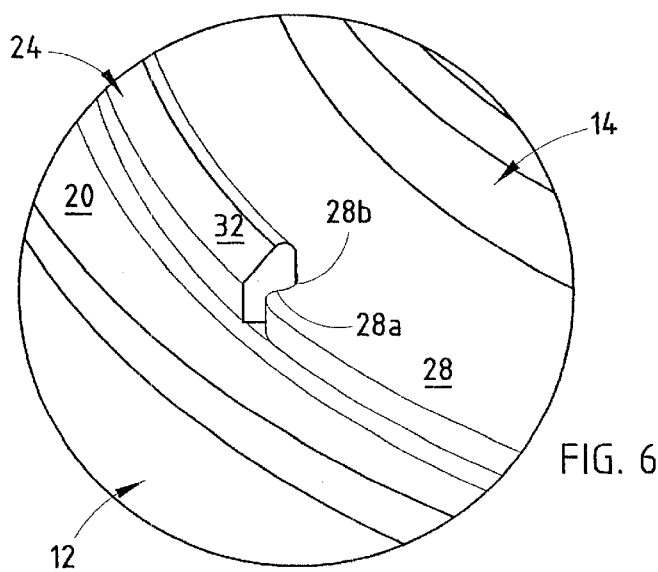
FIG. 6 is a further enlarged view showing the structure within the circle shown at the left in FIG. 5.

The size and relationship of the outside diameter of bonnet rim 26, and of retention tabs 28 and interference tabs 30, relative to corresponding diameters around the top of body/base 12, are of considerable importance as now to be described. The bonnet 14 rests directly atop body/base 12, with the outer rim or flange 26 of the bonnet resting upon flat, annular shoulder 22 of the base and its perimeter fitting inside and spaced at least slightly from the inner edges 24a of the upraised ridges 24. The retention tabs 28 extend outwardly through the open areas between the adjacent ends of upraised ridges 24, as generally illustrated in FIGS. 4 and 6. This positions the interference tabs 30 in alignment with the arcuate inner edges 24a of ridges 24, and it is important to point out that the arcuate outermost diametral edge of interference tabs 30 should be at least slightly greater (for example, on the order of about 0.005 inch) than the diameter of the arcuate inner edges 24a of ridges 24, so as to have an interference fit therewith. A further important aspect is the size and overall shape of the retention tabs 28, which have outwardly-diverging side extremities that give these tabs a dovetail configuration. The end extremities of ridges 24 have a complementary angular configuration, so that when the bonnet 14 is in place atop the body/base 12, the edges of retention tabs 28 and ends of ridges 24 have the relative positioning shown in FIGS. 4 and 6, in which the angular edges of ridges 24 project into the undercut side edges of the dovetail-shaped retention tabs 28, with the adjacent surfaces lying in closely contiguous relationship.

In the assembly of an operative device such as a pressure regulator 10, there will be certain pressure-regulating components mounted inside the dished interior of body 12, and parts of these may also lie within the space beneath the dome-shaped bonnet 14. As is well known, such pressure-regulating components often include a flexible diaphragm and a valve structure controlled by the relative positioning of the diaphragm during pressure variations inside the regulator 10, and one or more springs for biasing the diaphragm downwardly within body/base 12 against the inlet pressure. Such springs typically project upwardly into the space defined by the underside of bonnet 12, and bear upwardly against its top inner surface. Such regulators are typically assembled so that the springs are preloaded to a predetermined extent, which may fix the regulated output pressure in cases where the regulator is made to output a single pressure value, or else the spring force is made adjustable by various mechanisms located in the top of the bonnet (not shown), which include an adjustable screw or other such mechanism that acts upon the spring to force it downwardly and thereby change its loading and vary the regulated output pressure accordingly. The presence of the interference tabs 30 and their interference fit with the ridges 24, as mentioned above, has particular value in the case of pre-set regulators having springs which must be compressed at least to some extent by the bonnet when the same is secured in its mounted position. In the case of the present invention, the interference tabs 30, and their interference fit inside ridges 24, serve to retain the bonnet in its desired position for final assembly, while maintaining the applied diaphragm spring force. This greatly aids in manufacturing since it eliminates additional steps and/or mechanisms. That is, the regulating components are assembled and placed into their proper location inside body/base 12 at preceding assembly stations, and the bonnet 14 is then simply pressed into place atop body/base 12 against the pressure of the diaphragm-biasing spring, with sufficient force to seat the bonnet 14 upon the body/base 12 with the diaphragm held between the outer peripheral portions of each, whereupon the interference tabs 30 become wedged into place against the inside surface 24a of each ridge 24. This retains the bonnet 12 in place so that final assembly may take place.

Figure 7:
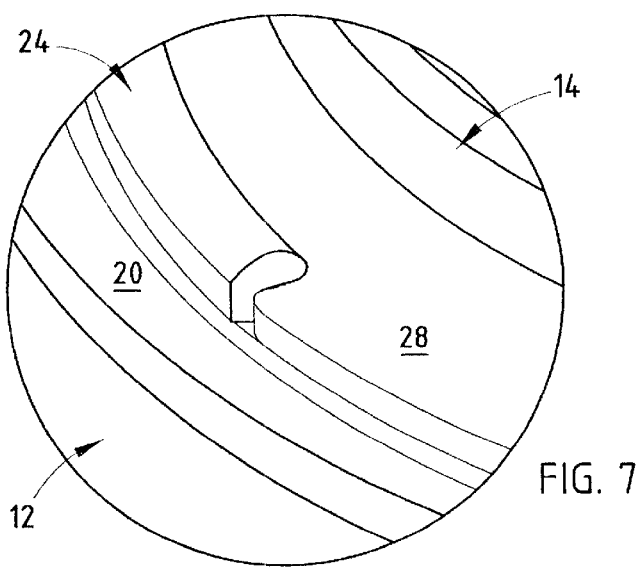
FIG. 7 is an enlarged perspective view similar to FIG. 6 but showing the structure within the circle shown at the left in FIG. 1, showing the components after final assembly.
Figure 8:
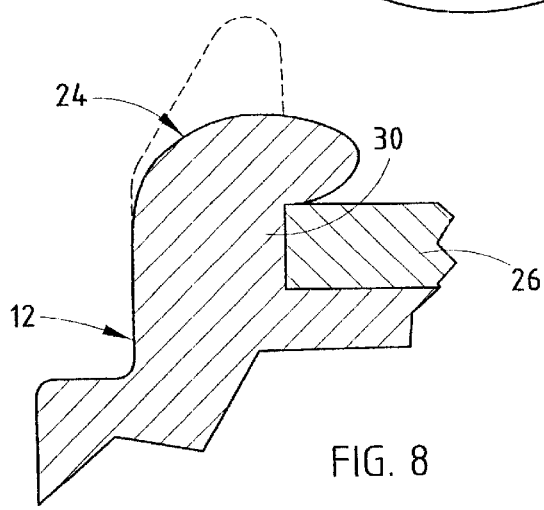
FIG. 8 is an enlarged, fragmentary sectional elevation taken along the plane VIII—VIII of FIG. 2.

Final assembly of the regulator 10 occurs at a succeeding station, where the upwardly-projecting flanges 24 are inwardly deformed under applied force, so as to overlie the adjacent edges of bonnet rim 26 (including interference tabs 30), as shown in FIGS. 1, 7, and 8. This step is advantageously carried out by use of the technique known as "orbit forming," in which a cup-shaped forging or riveting member is brought downwardly against the interference-fitted, self-retaining bonnet and base, with the regulator assembly in place within the assembled body and the latter held in an appropriate fixture carried along from one point to another in the assembly process, by known assembly line techniques. Typically, or preferably, the cup-shaped orbital forming tool is rotated as it comes forcibly down against the upper portion of ridges 24, which preferably have an angled outer shoulder 32 (FIGS. 4 and 6), which assists in the forging or riveting-type cold-flow deformation of the ridges 24 by providing a bearing surface which directs the applied forces appropriately, so as to deform the upper portions of flanges 24 inwardly and over the top of the peripheral edge portion 26 of bonnet 14 (FIGS. 7 and 8).

Assembly in the foregoing manner is rapid and effective, and provides a secure and reliable attachment of the bonnet 14 to the body/base 12. This secure attachment is substantially enhanced by the interengagement of the sides of retention tabs 28 and adjacent ends of the ridges 24, as noted above. That is, as may be better appreciated by contemplating FIG. 3, overpressure conditions inside the assembled regulator 10 will tend to distort bonnet 14 by bulging its domed upper portion outwardly, tending to axially elongate the latter. Depending on the amount of pressure and resulting distortion, the effect is to draw the outer perimeter of the bonnet into a smaller effective diameter, thereby pulling the outer marginal rim 26 out from under the overhanging portion of ridge 24 which otherwise secures it in place. Of course, if this distortion continues, the edges of bonnet 14 will become insufficiently retained and pull out from under the overhanging securement, thereby freeing the bonnet sufficiently to allow it to be blown off the top of the regulator.

The novel configuration and arrangement of parts provided in accordance with the invention, and in particular the shape and interengagement of the retention tabs 28 and edge extremities of ridges 24, serve to prevent such bonnet displacement due to overpressures. That is, the fact that the retention tabs 28 are wider at their outermost edges 28a than at their innermost edges 28b (FIGS. 3 and 6, for example), and the end extremities of ridges 24 have a corresponding and complementary angular configuration, creates a retentive engagement that prevents radially inward movement of the outermost extremities of bonnet 14 under such overpressure stresses, thereby serving to retain the bonnet firmly in place upon the body/base 12.

Accordingly, the present invention provides a superficially simple but very effective means of retaining thin, stamped bonnets atop their bases even under overpressure conditions, while at the same time lending itself very advantageously to rapid and inexpensive manufacturing/assembly procedures. Of course, the ability to use such thin, stamped bonnets provides significant manufacturing economies in and of itself, and these are further enhanced by the assembly procedures described above, utilizing the novel structures disclosed.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention, which is defined by the following claims as interpreted according to the principles of patent law, including the doctrine of equivalents. Additionally, the terms "comprising", "including" and "having" as may appear in the claims are to be interpreted as being open ended in accordance with traditional practice and therefore not limiting the claims to only those specified features, structures, locations, functions, steps compositions or combinations of a limitation as expressly recited in the claims.

We claim:

1. A pressure regulator comprising:

a base having plurality of ridges, each of the ridges having a first end edge and a second end edge with an opening being formed between each first end edge and second end edge of the ridges of adjacent ones of the ridges; and a bonnet adapted to be connected to the base, the bonnet including a peripheral rim having a plurality of retention tabs extending radially therefrom;

wherein the bonnet is connected to the base by inserting each retention tab of the bonnet into one of the openings between the first end edges and the second end edges of the ridges of the base and folding the ridges of the base over the peripheral rim of the bonnet.

2. The pressure regulator of claim 1, wherein:

each retention tab includes a first portion located in one of the openings between the first end edges and the second end edges of the ridges of the base and a second portion extending around the first end edge whereby the first end edge is located between the second portion and the peripheral rim.

3. The pressure regulator of claim 2, wherein:

each retention tab further includes a third portion extending around the second end edge whereby the second end edge is located between the third portion and the peripheral rim.

4. The pressure regulator of claim 3, wherein:

each retention tab is dovetail shaped.

5. The pressure regulator of claim 3, wherein:

the bonnet is formed from stamped metal.

6. The pressure regulator of claim 1, wherein:

the bonnet further includes an interference tab extending from the periphery of the rim and located between two of the retention tabs, the interference tab being configured to abut against one of the ridges to maintain the bonnet in position when each retention tab of the bonnet is inserted into one of the openings between the first end edges and the second end edges of the ridges of the base and before the ridges of the base are folded over the peripheral rim of the bonnet.

7. The pressure regulator of claim 1, wherein:

each of the ridges includes an arcuate interior surface, the arcuate interior surfaces of the ridges defining a first interrupted circle having a first radius;

the peripheral rim of the bonnet is annular;

the bonnet further includes a plurality of interference tabs extending from the periphery of the rim, each interference tab being located between two of the retention tabs, each interference tab including an arcuate peripheral surface, the arcuate peripheral surfaces of the interference tabs defining a second interrupted circle having a second radius;

the second radius is larger than the first radius; and each interference tab is configured to abut against one of the ridges in an interference fit to maintain the bonnet in position when each retention tab of the bonnet is inserted into one of the openings between the first end edges and the second end edges of the ridges of the base and before the ridges of the base are folded over the peripheral rim of the bonnet.

8. A vessel comprising:

a base having an internal cavity, the base further having a plurality of ridges, each of the ridges having a first end edge and a second end edge with an opening being formed between each first end edge and second end edge of adjacent ones of the ridges; and a cover connected to the base and covering the internal cavity, the cover including a peripheral rim having a plurality of flanges extending radially therefrom;

wherein each flange includes a first portion located in one of the openings between the first end edges and the second end edges of the ridges of the base and a second portion extending around the first end edge whereby the first end edge is located between the second portion and the peripheral rim.

9. The vessel of claim 8, wherein:

each flange further includes a third portion extending around the second end edge whereby the second end edge is located between the third portion and the peripheral rim.

10. The vessel of claim 9, wherein:

the cover is formed from stamped metal.

11. The vessel of claim 9, wherein:

each flange is dovetail shaped.

12. The vessel of claim 8, wherein:

the ridges of the base are folded over the peripheral rim of the cover.

13. The vessel of claim 12, wherein:

the cover further includes an interference tab extending from the periphery of the rim and located between two of the flanges, the interference tab being configured to abut against one of the ridges to maintain the cover in position before the ridges of the base are folded over the peripheral rim of the cover.

14. The vessel of claim 8, wherein:

each of the ridges includes an arcuate interior surface, the arcuate interior surfaces of the ridges defining a first interrupted circle having a first radius;

the peripheral rim of the cover is annular;

the cover further includes a plurality of interference tabs extending from the periphery of the rim, each interference tab being located between two of the flanges, each interference tab including an arcuate peripheral surface, the arcuate peripheral surfaces of the interference tabs defining a second interrupted circle having a second radius;

the second radius is larger than the first radius; and each interference tab abuts against one of the ridges in an interference fit.

15. A pressure regulator comprising:

a base having at least one ridge, the at least one ridge including an interior surface defining a periphery of an interior area; and a bonnet adapted to be connected to the base, the bonnet including a peripheral rim, the peripheral rim having at least one radially extending interference tab;

wherein the bonnet is connected to the base by inserting the peripheral rim within the interior area defined by the at least one ridge and folding the at least one ridge of the base over the peripheral rim of the bonnet; and wherein the at least one interference tab is configured to abut against the interior surface of the at least one ridge in an interference fit to maintain the bonnet in position when the peripheral rim of the bonnet is inserted into the interior area defined by the at least one ridge and before the at least one ridge of the base is folded over the peripheral rim of the bonnet.

16. The pressure regulator of claim 15, wherein:

the at least one ridge comprises a plurality of ridges, each of the ridges having a first end edge and a second end edge with an opening being formed between each first end edge and second end edge of adjacent ones of the ridges;

a bonnet further includes a plurality of radially extending retention tabs extending from the peripheral rim;

wherein each retention tab of the bonnet is inserted into one of the openings between the first end edges and the second end edges of the ridges of the base when the bonnet is connected to the base.

17. The pressure regulator of claim 16, wherein:

each retention tab includes a first portion located in one of the openings between the first end edges and the second end edges of the ridges of the base and a second portion extending around the first end edge whereby the first end edge is located between the second portion and the peripheral rim.

18. The pressure regulator of claim 17, wherein:

each retention tab further includes a third portion extending around the second end edge whereby the second end edge is located between the third portion and the peripheral rim.

19. The pressure regulator of claim 18, wherein:

the bonnet is formed from stamped metal.

20. The pressure regulator of claim 18, wherein:

each retention tab is dovetail shaped.

21. The pressure regulator of claim 15, wherein:

the at least one ridge comprises a plurality of ridges;

the at least one interference tab comprises a plurality of interference tabs;

the interior surfaces of the ridges are arcuate, the interior surfaces of the ridges defining a first interrupted circle having a first radius;

the peripheral rim of the bonnet is annular;

each interference tab including an arcuate peripheral surface, the arcuate peripheral surfaces of the interference tabs defining a second interrupted circle having a second radius; and the second radius is larger than the first radius.

22. A vessel comprising:

a base having an internal cavity, the base further having a plurality of ridges, the ridges each having an interior surface defining an interrupted periphery of an interior area; and a cover connected to the base and covering the internal cavity, the cover including a peripheral rim having a plurality of radially extending tabs;

wherein the peripheral rim of the cover is located within the interior area defined by the ridges and the ridges are folded over the peripheral rim of the base; and wherein the tabs abut against the interior surfaces of the ridges in an interference fit.

23. The vessel of claim 22, wherein:

the at least one ridge comprises a plurality of ridges, each of the ridges having a first end edge and a second end edge with an opening being formed between each first end edge and second end edge of adjacent ones of the ridges;

a cover further includes a plurality of radially extending flanges extending from the peripheral rim;

wherein each flange of the cover is inserted into one of the openings between the first end edges and the second end edges of the ridges of the base.

24. The vessel of claim 23, wherein:

each flange includes a first portion located in one of the openings between the first end edges and the second end edges of the ridges of the base and a second portion extending around the first end edge whereby the first end edge is located between the second portion and the peripheral rim.

25. The vessel of claim 24, wherein:

each flange further includes a third portion extending around the second end edge whereby the second end edge is located between the third portion and the peripheral rim.

26. The vessel of claim 25, wherein:

the cover is formed from stamped metal.

27. The vessel of claim 25, wherein:

each flange is dovetail shaped.

28. The vessel of claim 22, wherein:

the interior surfaces of the ridges are arcuate, the interior surfaces of the ridges defining a first interrupted circle having a first radius;

the peripheral rim of the cover is annular;

each tab including an arcuate peripheral surface, the arcuate peripheral surfaces of the tabs defining a second interrupted circle having a second radius; and the second radius is larger than the first radius.

* * * * *